United States Patent [19]

Otsuka et al.

[11] Patent Number: 4,772,904

[45] Date of Patent: Sep. 20, 1988

[54] DIAPHRAGM DRIVE DEVICE

[75] Inventors: Naoji Otsuka; Junichi Horikawa, both of Kanagawa; Masaaki Kuroda, Tokyo, all of Japan

[73] Assignee: Canon Kabushiki Kaisha, Tokyo, Japan

[21] Appl. No.: 923,313

[22] Filed: Oct. 27, 1986

[30] Foreign Application Priority Data

Oct. 31, 1985 [JP] Japan .................. 60-168658[U]

[51] Int. Cl.$^4$ .............................................. G03B 9/02
[52] U.S. Cl. ............................ 354/271.1; 354/235.1; 354/234.1
[58] Field of Search ............. 354/234.1, 235.1, 271.1

[56] References Cited

U.S. PATENT DOCUMENTS

| | | | |
|---|---|---|---|
| 4,100,558 | 7/1978 | Koike et al. ..................... | 354/271.1 |
| 4,113,359 | 9/1978 | Koike et al. ..................... | 354/271.1 |
| 4,320,950 | 3/1982 | Senuma et al. ................... | 354/235.1 |
| 4,390,262 | 6/1983 | Hirohata et al. ................. | 354/234.1 |
| 4,460,253 | 7/1984 | Kawai et al. ..................... | 354/271.1 |
| 4,470,687 | 9/1984 | Saito et al. ..................... | 354/271.1 |
| 4,472,039 | 9/1984 | Iwata et al. . | |
| 4,534,624 | 8/1985 | Toda et al. . | |
| 4,598,989 | 7/1986 | Yamada et al. .................. | 354/271.1 |
| 4,623,233 | 11/1986 | Yamada et al. .................. | 354/271.1 |

FOREIGN PATENT DOCUMENTS

| | | |
|---|---|---|
| 53-45631 | 11/1978 | Japan . |
| 53-45632 | 11/1978 | Japan . |
| 58-16208 | 1/1983 | Japan . |
| 58-10706 | 1/1983 | Japan . |
| 58-17428 | 2/1983 | Japan . |

*Primary Examiner*—Russell E. Adams
*Attorney, Agent, or Firm*—Fitzpatrick, Cella, Harper & Scinto

[57] ABSTRACT

A diaphragm drive device comprising a first yoke having a plurality of radially extending pole teeth toward the optical axis, a second yoke having a plurality of radially extending pole teeth toward the optical axis, the pole teeth of the first and second yokes alternating each other in a common plane, exciting coils for exciting all the pole teeth of the first and second yokes as held on these yokes, and an apertured disc-like permanent magnet arranged to be rotatable in spaced relation to the plane of the pole teeth of the first and second yokes by a constant axial distance, the magnet being made of a mixture of resin and magnetic materials by molding techniques and magnetized in such a way that the magnetic axes of the domains of the magnetic material are oriented toward only one of the radial surfaces of the disc, wherein the apertured disc-shaped permanent magnet is drivingly connected to the diaphragm blades.

5 Claims, 4 Drawing Sheets

DIAPHRAGM DRIVE DEVICE

BACKGROUND OF THE INVENTION

1. Field of the Invention

This invention relates to a diaphragm drive device for driving the diaphragm blades by a resin-molded magnet rotor.

2. Description of the Related Art

In the past, as the motor for driving the diaphragm or shutter blades in the camera, as shown in Japanese Utility Model Publication No. SHO 53-45632, there is known the structure of the diaphragm drive device comprising an annular rotor concentrically arranged on the outer periphery of tubular body, an annular stator concentrically arranged as directed toward one end surface of this rotor, a rotatable frame fixed to the rotor, rollers supporting the rotatable frame to rotate freely, these parts being the main parts, and the rotor having the form of a flat plate ring-shaped permanent magnet plate made of ferrite.

Also, in the conventional interchangeable lens barrel, the opening and closing of the diaphragm blades has been controlled in such a manner that the activating force resulting from the exposure control operation from the camera side is transmitted to the lens side by a lever mechanism between the lens and the camera body, thereby the diaphragm blades are opened and closed by the rotating operation of the lever.

However, in recent years, the use of electronics in the control of the camera system has led to proposals for attempting the control of the diaphragm blades within the interchangeable lens barrel by means of a motor as in U.S. Pat. No. 4,534,624 (corresponding to the Japanese Laid-Open Patent Applications Nos. SHO 58-16208 and SHO 58-10706). Because the opening and closing operation of the diaphragm blades is controlled stepwise in favor of the relative aperture, for the drive accuracy is improved by employing the pulse drive control method combination with the digital control method for the exposure of the camera, it is desirable to make the drive control by the stepping motor. Therefore, a proposal of controlling the diaphragm by the rotor of the stepping motor is also shown in U.S. Pat. No. 4,472,039 (corresponding to Japanese Laid-Open Patent Application No. SHO 58-17428.

The use of the stepping motor in the drive control of the diaphragm blades is advantageous from the above-described reason, and approaches one step ahead toward a perfect electronic system between the lens and the camera body. Yet, a number of problems are left unsolved.

One of them is that the incorporation of the stepping motor in the lens barrel, particularly interchangeable one, calls for a great increase in the size and weight of the barrel. Being not limited to the stepping motor, the motors generally have many constituent parts such as the permanent magnet, coils and yokes. Moreover, the main ones of the constituent parts are all made of metallic materials, and have large specific gravities, contributing to a very large proportion of the overall weight of the barrel.

The second problem lies in the rotor of the motor. In case when the rotor is drivingly connected either directly or indirectly to the diaphragm blades and the opening and closing action of the diaphragm blades is taken by the stepwise drive of the rotor, if the rotor itself is very heavy, the required rotating torque is necessarily large. For this reason, the consumption of electrical power is increased largely.

Also, if the weight of the rotor is large, another problem arises in the point of inertial moment. In more detail, when shooting the camera with the interchangeable lens attached thereto, the object brightness is measured with the diaphragm blades at full open aperture to derive an exposure value, or the so-called open aperture light metering is carried out.

Therefore, the diaphragm blades must be maintained in the full open aperture state always before the light metering. However, upon consideration of the shooting situation of the camera, particularly the single lens reflex camera, it sometimes happens for the photographer to catch an instantaneous shutter chance by quickly moving the camera in pursuit of the situation of the object. In such a case, if the inertial moment of the rotor within the barrel, the rotor will be caused to rotate, accidentally closing down the diaphragm from the full open aperture position. Thus, it becomes impossible to assure that the diaphragm is fully opened when the light metering is carried out.

The third problem also arises from the rotor. As shown in the above-cited Japanese Utility Model Publication No. SHO 53-45632, the rotor is made of magnetic material and formed to a ring shape with a plurality of pairs of N and S poles in a common circle with the center at the optical axis. Therefore, the magnetic flux is produced from both surfaces of the ring. In case when the diaphragm blades are made of metal or magnetizable material, they are influenced by that magnetic flux and, in turn, affect the accuracy of exposure control.

SUMMARY OF THE INVENTION

The present invention is to eliminate the above-described problems by reducing the size and weight of the rotor magnet and by controlling the orientation characteristic of the magnetic material so that the magnetic flux lies only on one side of the rotor magnet, when the rotor magnet is used for the drive control of the diaphragm blades.

A first object of the invention is to provide a diaphragm drive device in which the magnet of the motor for driving the blades of a diaphragm for controlling the exposure is made of resin material with an advantage of reducing the weight of the motor, and further of contributing a large decrease of the total weight of the entire body of the diaphragm unit, and the removal of the bad influence of the magnetic property of that magnet on the operation of the diaphragm blades has been achieved.

A second object of the invention is to provide a diaphragm drive device of the stepwise drive type in which the load against the rotation of rotary magnet is reduced and the resistance against the rotation of the magnet is lowered to assure smooth rotation of the magnet about the optical axis.

BRIEF DESCRIPTION OF THE DRAWINGS

FIGS. 1 to 8 illustrate an embodiment of the invention.

DESCRIPTION OF THE PREFERRED EMBODIMENT

Figure 1:
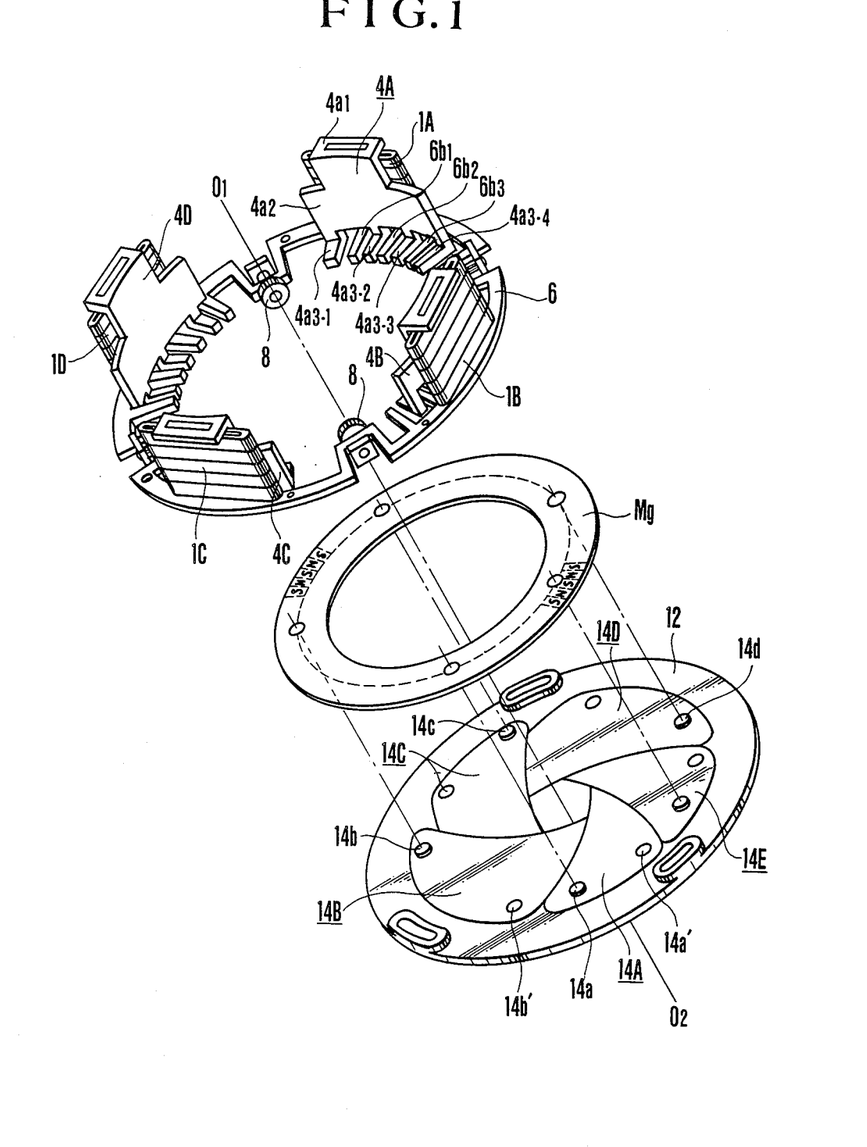
FIG. 1 is an exploded perspective view of the drive device.
Figure 2:
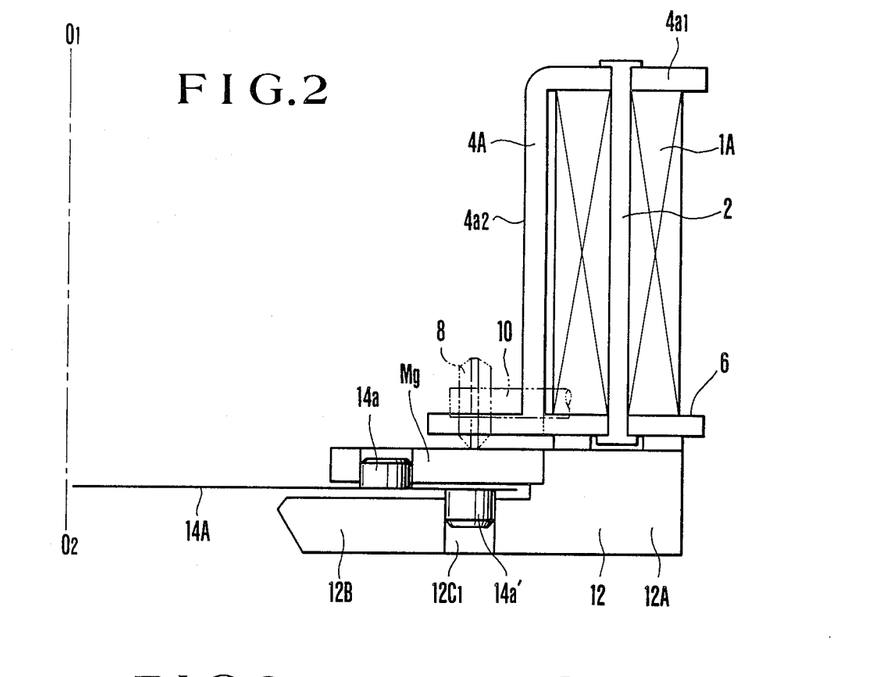
FIG. 2 is a fragmentary section view of the device of FIG. 1.

FIG. 1 in the perspective view and FIG. 2 in the axial section view show the diaphragm drive device employing a rotor magnetized to polar anisotropy according to the invention.

Figure 3:
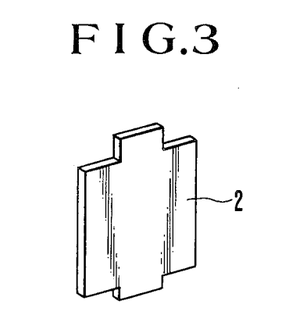
FIG. 3 is a perspective view of the iron core.

In these figures, exciting coils 1A, 1B, 1C and 1D each are turned round a respective individual iron core 2 shown in FIG. 3.

Figure 4:
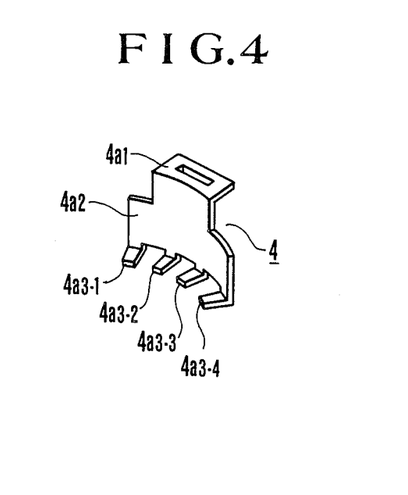
FIGS. 4 and 5 illustrate the details of the first and second yokes respectively.

A first yoke 4 has four members 4A, 4B, 4C and 4D, of which the first 4A is shown in detail in FIG. 4, comprising a flanged portion $4a_1$ holding the iron core 2 at one end thereof, an arcuate portion $4a_2$ partly surrounding an optical axis O of a photographic lens, and a plurality of teeth $4a_{3-1}$, $4a_{3-2}$, ..., $4a_{3-n}$ extending perpendicularly of the opposite end of the arcuate portion $4a_2$ to that having the flanged portion $4a_1$ in radial directions toward the optical axis O.

Figure 5:
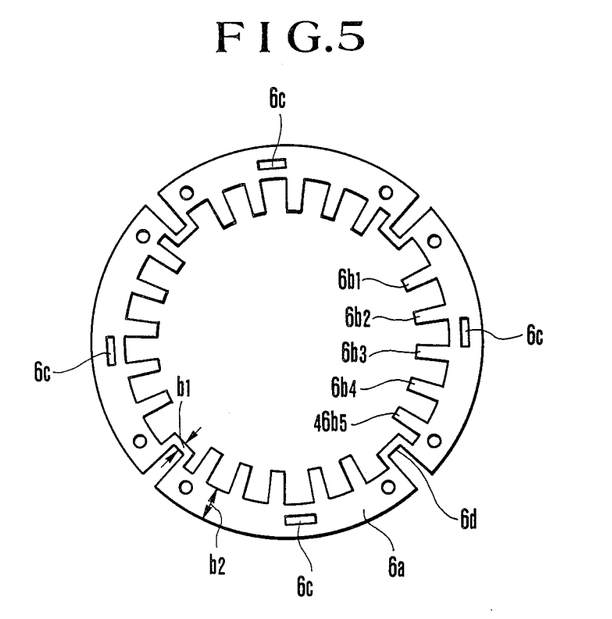

A second yoke 6 has, as shown in FIG. 5, a ring portion $6a$, and a large number of radial pole teeth $6b_1$, $6b_2$, ..., $6b_n$ extending from the inner periphery of the ring portion $6a$ toward the optical axis O and grouped in a plurality of units such as shown in the drawing. The first and second yokes when assembled have their pole teeth $4a_3$ and $6b$ alternating each other in a common circle with its center at the optical axis O.

$6c$ is grooves at which the lower ends of the iron cores 2 are fixed to the second yoke 6.

Hence, the first and second yokes are held in fixedly secured relation to each other through the four iron cores 2, and the pole teeth of one of the first and second yokes each intervene between the adjacent two of the pole teeth of the other yoke, so that all the pole teeth have the same axial position as shown in FIG. 2.

Four rollers 8 for supporting a rotor magnet Mg rotatably are journaled on respective shafts 10 which are fixedly mounted on holders $6d$ each in a space between the two of the groups of pole teeth. The shaft holders $6d$ are positioned in the ring portion $6a$ of the second yoke 6 at locations between the groups of pole teeth, and are formed to such a shape as protruding from the ring portion $6a$ toward the optical axis O with the width $b_1$ of the protruded portion being designed to be narrower than the width $b_2$ of the ring portion $6a$ so that the magnetic flux of one block is prevented from flowing into the adjacent blocks.

A casing 12 for diaphragm blades 14A and the rotor magnet Mg is constructed with a ring 12A and a disc portion 12B extending inwardly of the ring 12A, and whose thickness is thinner than that of the ring 12A. Five arcuate camming slots $12c_1$, $12c_2$, ..., $12c_5$ of which only one $12c_1$ is shown in FIG. 2 are formed in the disc portion 12B to determine the size of aperture opening of the diaphragm blades.

The rotor magnet Mg in the form of a flat plate ring is fitted in the inner diameter of the ring 12A of the blade casing 12.

The diaphragm blades 14A are arranged between the disc portion 12B of thin thickness of the casing 12 and the rotor magnet Mg. Each of the blades 4A has a pivot pin $14a$ fixedly mounted on the upper surface thereof and movably fitted in a hole of the rotor magnet Mg, and a cam follower pin $14a'$ extending into the camming slot $12c_1$ of the casing 12.

In operating the motor of such construction, a voltage for excitation of pulse form or alternating current form is applied across the ends of the exciting coil 1A, 1B, 1C, 1D shown in FIG. 1, thereby electromagnetic action is performed between the first yoke members 4A; 4B, 4C and 4D and the second yoke member 6. In more detail, each yoke member is polarized to S or N pole and the S or N pole appears in each pole tooth. Therefore, the S and N poles are alternatingly produced in the pole teeth in confrontation with the magnetic poles of the magnet Mg.

The driving method of the motor of the structure of this embodiment may be by using the conventional drive circuit, for example, 2-phase exciting circuit, wherein the coils 1A and 1C are of the same phase, and the coils 1B and 1D are of the same phase Next, the structure of the flat plate ring-shaped magnet Mg of which the orientation of magnetization is of polar anisotropy will be explained according to the present invention.

Figure 6:
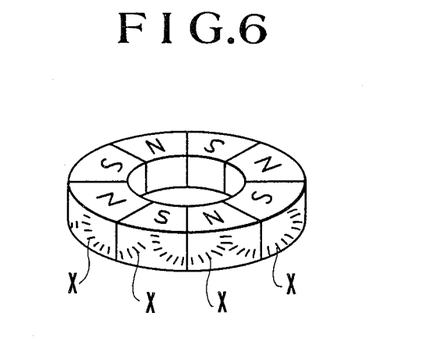
FIG. 6 is a perspective view illustrating the orientation of the magnetic axes in the magnet rotor.

FIG. 6 in perspective view illustrates the drive magnet Mg according to the invention where the symbol X designates the orientation of the magnetic material.

Figures 7, 8:
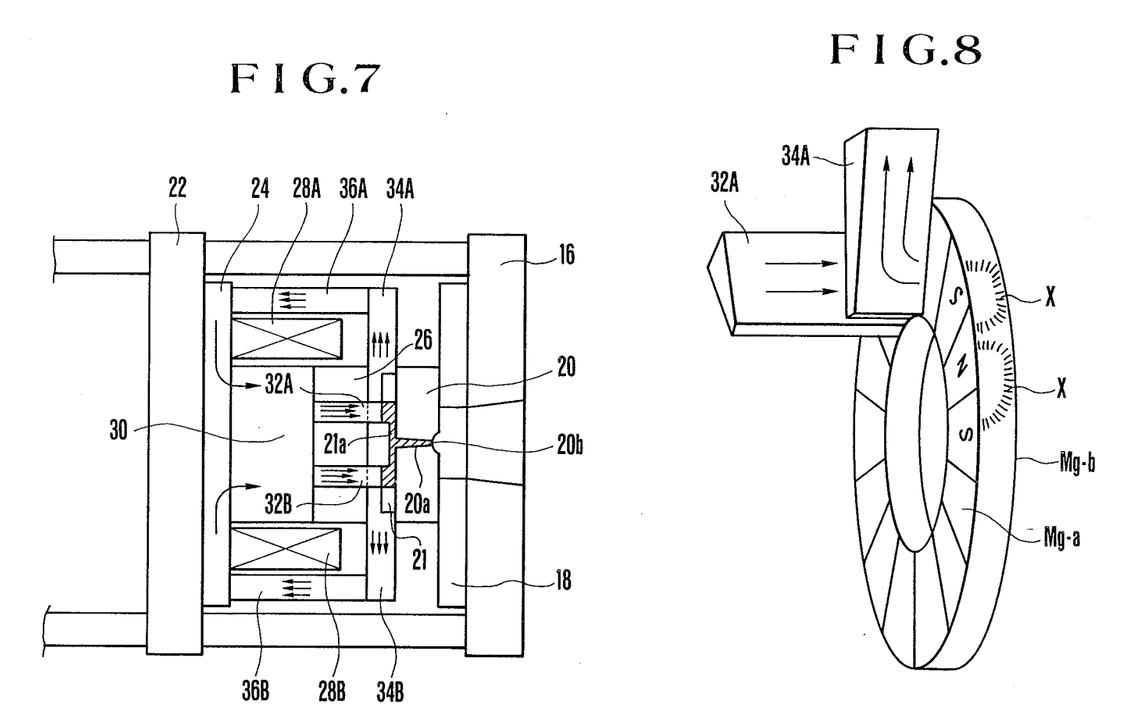
FIGS. 7 and 8 illustrate a molding apparatus with means making possible the orientation of the magnetic axes shown in FIG. 6.

FIGS. 7 and 8 illustrate the apparatus for molding the magnet Mg. The magnet Mg is made of a resin material consisting of 6-nylon resin as the main substance and barium ferrite as the auxiliary substance.

The apparatus includes a fixed platen 16, a stationary set-up plate 18, a die plate member 20, a metal mold 21 having a cavity for forming the shape of the aforesaid magnet Mg, a movable platen 22, a movable set-up plate 24, a movable die plate 26, coils 28A, 28B for controlling the orientation of the magnetic axes of the domains in the molten resin material injected into the cavity of the metal mold 21, and a spacer block 30.

The aforesaid metal mold 21, movable set-up plate 24 and spacer block 30 are made of magnetic material. First magnetic path members 32A, 32B form a magnetic path between the spacer block 30 and the metal mold 21. Second magnetic path members 34A, 34B connect respectively the first magnetic members 32A, 32B to third magnetic path members 36A, 36B through the resin material in the cavity of the mold. The third magnetic path members 36A, 36B in turn connect the second magnetic path members 34A, 34B to the movable set-up plate 24.

The number of pairs of the first and second magnetic path members 32A and 34A, 32B and 34B, ... is made equal to the required number of poles of the magnet Mg.

The operation of the apparatus is as follows: An injection cylinder (not shown) is attached to the entrance mouth $20b$ of a sprue $20a$ of the stationary set-up plate 20 and injects into the cavity $21a$ of the mold 21 a mixture of a resin material with a magnetic material having a behavior of orientation characteristic such as barium ferrite.

After a required amount of the mixture has been injected into the metal mold 21, the coils 28A and 28B are supplied with current. Thus, the current flows through the magnetic circuit: the movable set-up plate 24—the spacer block 30—the first magnetic path member 32A—the resin material in the metal mold 21—the second magnetic path member 34A—the third magnetic path member 36A, thereby the resin material in the mold is magnetized. As shown in FIG. 8, the first magnetic path member 32A with its end face exposed to the flat plate ring-shaped cavity within the metal mold is directed to the perpendicular direction (parallel with the optical axis O) to a plane Mg-a of the flat plate ring-shaped magnet Mg, when all the first magnetic path members 32 are mounted on the movable die plate 26 in fixedly secured relation at a common circle. The second magnetic path member 34A is arranged adjacent to the first magnetic path member 32A in radiating relation perpendicular to the optical axis O. All the second magnetic path members 34 lie in a common plane to one another and also to the aforesaid plane Mg-a.

A magnetic flux B from the coil flows through the first magnetic path member 32A to the resin material in the metal mold. Since the second magnetic path members 34, as has been described above, are arranged in the same plane as that of the first magnetic path members on one side of the magnet Mg, because the die plate member 20 is made of non-magnetic material, the magnetic flux B is made to enter the resin material body at one side surface thereof from the first magnetic path member 32A and then to pass through a curved path to the second magnetic path member 34A. Therefore, the magnetic axes of the domains of the magnetic material in the resin mixture are made to orient as indicated by a symbol X in FIG. 8. That is, the magnetic flux entering from one surface Mg-a does not go past the opposite surface Mg-b, but is caused to bend toward the adjacent magnetic path members on the left or right side of the first magnetic path member 32A. As a result, the domains of the magnetic materials are arranged to a letter "U" shape with their magnetic axes gradually reversing in orientation. Since, on one side of the metal mold 21, the first and second magnetic path members are paired up in the equal number to that of the poles, the equal number of almost "U" shaped magnetic elements are formed in the single rotor, each magnet element having the magnetic axes of the domains of the magnetic material oriented along the "U" shaped path from a certain position on one surface of the rotor to another certain position in the same surface as shown in FIG. 8.

The rotor of permanent magnet Mg produced from the molding apparatus of FIGS. 7 and 8 has an advantage that, because of its using the resin material as the main substance, its weight is very light.

Another advantage is that because the magnetic circuit is formed only on one side Mg-a of the rotor, the diaphragm blades on the opposite side Mg-b of the rotor are not affected by the magnetic circuit.

As has been described above, according to the present invention, the diaphragm blades are made driven by a motor, particularly of the stepping type with a rotor of permanent magnet, and further the rotor is constructed in such a way that it has a form of a flat plate, that its material is a mixture of a resin and a magnetic substance, and that when molding, the magnetic axes of the domains of the magnetic substance are so oriented that the N and S poles appears in only one side surface of the flat plate, and no magnetic flux is formed on the opposite side of the flat plate so that a polar anisotropy is established.

What is claimed is:

1. A diaphragm drive device comprising:
   (a) a diaphragm unit having a plurality of diaphragm blades;
   (b) a ring-shaped magnet having an engagment portion engageable with said diaphragm blades, said ring-shaped magnet having only one surface of its ring surface magnetized to form N and S poles, wherein the orientation of the magnetism of each pole is so arranged that the magnetic orientation from the N pole toward the S pole is directed from the position of the N pole on said one surface toward the position of the S pole on said one surface, while the orientation of the magnetism is not directed to a surface opposite to said one surface, and wherein said diaphragm blades are positiond at said opposite surface of said ring-shaped magnet;
   (c) a magnetic polar member having a plurality of pole teeth bent in the direction of the optical axis and a holding part for holding said plurality of pole teeth; and
   (d) an exciting coil for exciting said plurality of pole teeth of said magnetic polar member.

2. A diaphragm drive device comprising:
   (a) a diaphragm unit having a plurality of diaphragm blades;
   (b) a magnetic of ring shaped engaging said diaphragm blades tharough a pin-drive connection, said ring-shaped magnet being magnetized so that all its N and S poles are disposed on only one surface thereof, the magnetic orientation of each pole being directed from the position of the N pole on said one surface to the position of the S pole on said one surface, but not directed to a surface opposite to said one surface, and said diaphragm blades being arranged on said opposite surface of said magnet which has no magnetic orientation;
   (c) a plurality of yoke members provided at said one surface of said magnet, wherein said plurality of yoke members comprise first and second yoke members, wherein said first yoke member has a ring shape and pole teeth extending from an inner plane thereof toward an optical axis of said diaphragm blades, and wherein said second yoke member comprises a plurality of pole teeth and an arcuate member formed along the periphery of said first yoke member, the pole teeth of said second yoke member being bent from one end of said arcuate member and extending toward said optical axis, and the pole teeth of said first yoke member and second yoke member being grouped into spaced apart groups;
   (d) a roller member arranged in the space between two of said groups; and
   (e) an exciting coil for exciting said pole teeth of said plurality of yoke members, said exciting coil being provided at everyone of said groups said plurality of yoke members.

3. A diaphragm drive device comprising:
   (a) a diaphragm unit having a plurality of diaphragm blades;
   (b) a magnet formed to a ring-like shape and engaging said diaphragm blades through a pin-drive connection, said ring-shaped magnet being magnetized with multiple N and S poles all positioned on only a surface opposite a surface facing said diaphragm blades, the magnetic orientation of each pole being directed form the position of an N pole on said opposite surface to the position of an S pole on said opposite surface, but not directed to said surface which faces said diaphragm blades;

(c) a plurality of yoke members provided at said opposite surface of said magnet and having a plurality of pole teeth, said plurality of yoke members comprising first and second yoke members, said first yoke member forming a ring shape and having a plurality of pole teeth extending from an inner plane thereof toward an optical axis of said diaphragm blades, said second yoke member comprising a plurality of pole teeth and an arcuate portion projecting from said first yoke member, and said pole teeth of said second yoke member being bent from said arcuate portion and extending in the direction of said optical axis, and said pole teeth of said second yoke member being arranged between the pole teeth of said first yoke member; and (d) an exciting coil for exciting the pole teeth of said first and second yoke members, said exciting coil being so arranged to project in parallel with the arcuate portion of said second yoke member and being supported at said first yoke member and at said arcuate portion of said second yoke member.

4. A diaphragm drive device according to claim 3, wherein the pole teeth of said first yoke member are grouped to a plurality of units along a circle with its center at the optical axis, and said ring portion between the groups is formed to a narrower width.

5. A diaphragm drive device according to claim 4, further including a roller arranged on said narrower width of said ring portion to rotataly support said magnet.

* * * * *

UNITED STATES PATENT AND TRADEMARK OFFICE
CERTIFICATE OF CORRECTION

PATENT NO. : 4,772,904

DATED : September 20, 1988

INVENTOR(S) : Otsuka et al.

It is certified that error appears in the above-identified patent and that said Letters Patent is hereby corrected as shown below:

COLUMN 1

Line 46, "No. SHO 58-17428." should read --No. SHO 58-17428).--.

COLUMN 2

Lines 17-18, "if" should read --due to--.

COLUMN 3

Line 33, "alternating" should read --alternating with--; and

Line 68, "blades 4A" should read --blades 14A--.

COLUMN 4

Line 45, "first magnetic members 32A, 32B should read --first magnetic path members 32A, 32B--.

COLUMN 5

Line 39, " "U" shaped" should read --"U"-shaped--;

Line 42, " "U" shaped" should read --"U"-shaped--;

Line 44, "in" (first occurrence) should read --on--; and

Line 61, "appears" should read --appear--.

UNITED STATES PATENT AND TRADEMARK OFFICE
CERTIFICATE OF CORRECTION

PATENT NO. : 4,772,904

DATED : September 20, 1988

INVENTOR(S) : Otsuka et al.

It is certified that error appears in the above-identified patent and that said Letters Patent is hereby corrected as shown below:

COLUMN 6

Line 1, "engagment" should read --engagement--.

Line 12, "positiond" should read --positioned--;

Line 23, "magnetic of ring shaped" should read --magnet of ring shape--;

Line 24, "tharough" should read --through--;

Line 53, "everyone" should read --every one--; and "groups" should read --groups of--; and Line 65, "form" should read --from--.

UNITED STATES PATENT AND TRADEMARK OFFICE
CERTIFICATE OF CORRECTION

PATENT NO. : 4,772,904

DATED : September 20, 1988

INVENTOR(S) : Otsuka et al.

It is certified that error appears in the above-identified patent and that said Letters Patent is hereby corrected as shown below:

COLUMN 8

Line 9, "to" should read --into--; and

Line 14, "rotataly" should read --rotatably--.

Signed and Sealed this

Twenty-fifth Day of July, 1989

Attest:

DONALD J. QUIGG

Attesting Officer

Commissioner of Patents and Trademarks